United States Patent
Xie et al.

(10) Patent No.: US 10,477,115 B2
(45) Date of Patent: Nov. 12, 2019

(54) METHOD FOR MEASURING AMBIENT BRIGHTNESS VALUE AND PHOTOGRAPHING DEVICE

(71) Applicant: Sengled Co., Ltd., Shanghai (CN)

(72) Inventors: Shengli Xie, Shanghai (CN); Jinxiang Shen, Shanghai (CN)

(73) Assignee: SENGLED CO., LTD., Shanghai (CN)

( * ) Notice: Subject to any disclaimer, the term of this patent is extended or adjusted under 35 U.S.C. 154(b) by 0 days.

(21) Appl. No.: 15/743,864

(22) PCT Filed: Jan. 17, 2017

(86) PCT No.: PCT/CN2017/071357
§ 371 (c)(1),
(2) Date: Jan. 11, 2018

(87) PCT Pub. No.: WO2017/128988
PCT Pub. Date: Aug. 3, 2017

(65) Prior Publication Data
US 2018/0205865 A1    Jul. 19, 2018

(30) Foreign Application Priority Data
Jan. 29, 2016    (CN) .......................... 2016 1 0064696

(51) Int. Cl.
H04N 5/33        (2006.01)
H04N 5/235       (2006.01)
H04N 5/225       (2006.01)

(52) U.S. Cl.
CPC ......... *H04N 5/2354* (2013.01); *H04N 5/2256* (2013.01); *H04N 5/2351* (2013.01); *H04N 5/2353* (2013.01); *H04N 5/33* (2013.01)

(58) Field of Classification Search
CPC .......... H04N 5/33; H04N 5/235; H04N 5/225; H04N 5/2354; H04N 5/2256; H04N 5/2353; H04N 5/2351
(Continued)

(56) References Cited

U.S. PATENT DOCUMENTS 5,485,201 A * 1/1996 Aoki .................. G03B 7/16
                                       348/223.1
8,175,406 B2 * 5/2012 Chang ................ H04N 5/217
                                       358/3.26
(Continued)

FOREIGN PATENT DOCUMENTS

CN        101126661 A       2/2008
CN        104113744 A       10/2014
(Continued)

OTHER PUBLICATIONS

The World Intellectual Property Organization (WIPO) International Search Report for PCT/CN201T/071357 dated Mar. 23, 2017 12 Pages.

*Primary Examiner* — Trang U Tran
(74) *Attorney, Agent, or Firm* — Anova Law Group, PLLC

(57) ABSTRACT

The present disclosure provides a method for measuring an ambient brightness value, including: obtaining an exposure value of a photographing device during an automatic exposure process and an image brightness value corresponding to the exposure value; and determining an ambient brightness value based on the exposure value, the image brightness value, and an automatic exposure enhancement coefficient of the photographing device.

10 Claims, 2 Drawing Sheets

(58) Field of Classification Search
USPC ...... 348/164, 222.1, 229.1, 221, 223.1, 364;
382/254, 260
See application file for complete search history.

(56) References Cited

U.S. PATENT DOCUMENTS

| | | | | |
|---|---|---|---|---|
| 8,345,120 B2* | 1/2013 | Takeuchi | ............... | H04N 5/235 |
| | | | | 348/229.1 |
| 8,368,783 B2* | 2/2013 | Huang | ................. | H04N 5/2353 |
| | | | | 348/222.1 |
| 2009/0074322 A1 | 3/2009 | Chang | | |

FOREIGN PATENT DOCUMENTS

| | | |
|---|---|---|
| CN | 104301616 A | 1/2015 |
| CN | 105530437 A | 4/2016 |
| JP | 2008301342 A | 12/2008 |

\* cited by examiner

METHOD FOR MEASURING AMBIENT BRIGHTNESS VALUE AND PHOTOGRAPHING DEVICE

CROSS-REFERENCES TO RELATED APPLICATIONS

This application claims the priority of Chinese Patent Application No. 201610064696.3 filed on Jan. 29, 2016, the entire content of which is incorporated herein by reference.

FIELD OF THE DISCLOSURE

The present disclosure generally relates to the field of light emitting diode (LED) technologies and, more particularly, relates to a method for measuring an ambient brightness value and a photographing device.

BACKGROUND

Photographing devices such as video surveillance equipment, often need to measure an ambient brightness value or ambient brightness level. Accordingly, when the brightness is relatively low, the infrared light fill-in device on the video surveillance equipment may be turned on, and the video surveillance equipment may take black and white images. Thus, the recognizable degree of the images may be enhanced/increased.

Currently, conventional video surveillance equipment often use photosensitive devices contained in the video surveillance equipment to measure the ambient brightness value. The photosensitive devices often include photosensitive resistors, photosensitive diodes, or photosensitive sensors.

However, because photosensitive devices are optical devices, which are highly demanding on the design of the product structures and the manufacturing precision of the products. Sometimes, the same type of video surveillance equipment produced by the same manufacturer have different measurement results of the same ambient, and thus a relatively high measurement error occurs among these video surveillance equipment. As a result, the uniformity of the products may be relatively low. In addition, a video surveillance equipment often requires the measured ambient brightness value or ambient brightness level to be lower than a preset threshold value to turn on the light fill-in device. The light emitted by an infrared light fill-in device may also include visible light, which can cause interference to the measurement of the photosensitive device. As a result, the accuracy of the measurement may be relatively low.

The disclosed methods and devices are directed to solve one or more problems set forth above and other problems.

BRIEF SUMMARY OF THE DISCLOSURE

One aspect of the present disclosure provides a method for measuring an ambient brightness value, including: obtaining an exposure value of a photographing device during an automatic exposure process and an image brightness value corresponding to the exposure value; and determining an ambient brightness value based on the exposure value, the image brightness value, and an automatic exposure enhancement coefficient of the photographing device.

Optionally, the method further includes: in response to determining the ambient brightness value is lower than a preset threshold value, turning on at least one light fill-in device.

Optionally, the at least one light fill-in device is an infrared light fill-in device.

Optionally, determining an ambient brightness value based on the exposure value, the image brightness value, and an automatic exposure enhancement coefficient of the photographing device includes: calculating the ambient brightness value $L_E$ based on equation $L_E=L/(K \times E)$, wherein L represents the image brightness value, E represents the exposure value, and K represents the automatic exposure enhancement coefficient of the photographing device.

Optionally, the automatic exposure enhancement coefficient K of the photographing device is preset in the photographing device before the automatic exposure process.

Optionally, the automatic exposure enhancement coefficient K of the photographing device is an average of a plurality of first automatic exposure enhancement coefficients $K_{nS}$, each first automatic exposure enhancement coefficient $K_n$ being calculated as $K_n=E_n \times L_{E1}/L_n$, wherein $E_n$ represents a first exposure value under laboratory environment, $L_{E1}$ represents an ambient brightness value under the laboratory environment, and $L_n$ represents a first image brightness value corresponding to the first exposure value under the laboratory environment.

Another aspect of the present disclosure provides a photographing device, including: an obtaining module, configured to obtain an exposure value of a photographing device during an automatic exposure process and an image brightness value corresponding to the exposure value; and a computing module, configured to determine an ambient brightness value based on the exposure value, the image brightness value, and an automatic exposure enhancement coefficient of the photographing device.

Optionally, the photographing device further includes a processing module, configured to turn on at least one light fill-in device in response to determining the ambient brightness value is lower than a preset threshold value.

Optionally, the at least one light fill-in device is an infrared light fill-in device.

Optionally, determining an ambient brightness value based on the exposure value, the image brightness value, and an automatic exposure enhancement coefficient of the photographing device includes: calculating the ambient brightness value $L_E$ based on equation $L_E=L/(K \times E)$, wherein L represents the image brightness value, E represents the exposure value, and K represents the automatic exposure enhancement coefficient of the photographing device.

Optionally, the automatic exposure enhancement coefficient K of the photographing device is preset in the photographing device before the automatic exposure process.

Optionally, the automatic exposure enhancement coefficient K of the photographing device is an average of a plurality of first automatic exposure enhancement coefficients $K_{nS}$, each first automatic exposure enhancement coefficient $K_n$ being calculated as $K_n=E_n \times L_{E1}/L_n$, wherein $E_n$ represents a first exposure value under laboratory environment, $L_{E1}$ represents an ambient brightness value under the laboratory environment, and $L_n$ represents a first image brightness value corresponding to the first exposure value under the laboratory environment.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
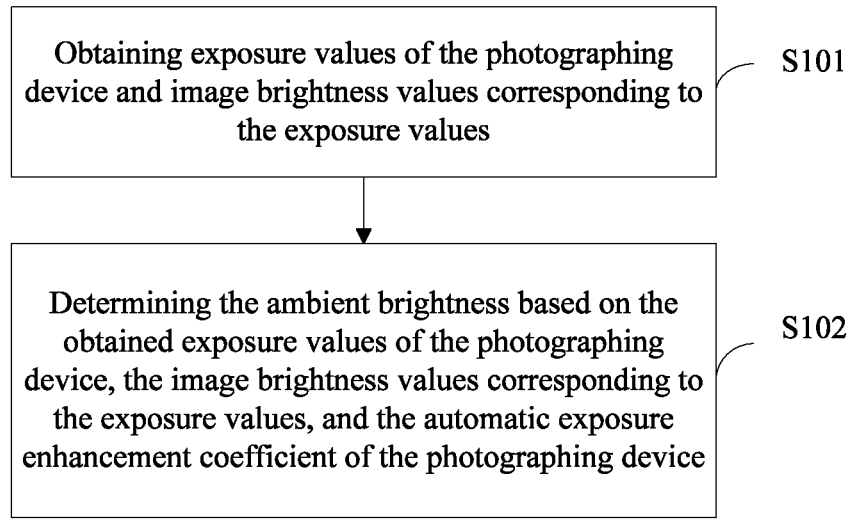
FIG. 1 illustrates an exemplary flow chart of a process for measuring an ambient brightness value consistent with various disclosed embodiments of the present disclosure.

FIG. 1 illustrates an exemplary flow chart of the disclosed method for measuring the ambient brightness value/level. As shown in FIG. 1, the method may be executed by a photographing device with automatic exposure function, such as a video surveillance device. For example, the video surveillance device may be a video camera. The method may include steps S101-S102.

In step S101, the exposure values of the photographing device and the image brightness values corresponding to the exposure value may be obtained.

Specifically, during an automatic exposure, the photographing device, with automatic exposure function, may record the exposure value of the automatic exposure and the image brightness value corresponding to the exposure value, using the software in the photographing device. The photographing device may directly obtain the recorded exposure value and the image brightness value corresponding to the exposure value from the storage of the photographing device.

The exposure value may be a product of the analog gain, the digital gain, and the exposure time.

In step S102, the ambient brightness value may be determined based on the obtained exposure value, the image brightness value, and the automatic exposure enhancement coefficient of the photographing device.

Specifically, the ambient brightness value $L_E$ may be calculate using the equation: $L_E = L/(K \times E)$. In the equation, L may be the image brightness value, E may be the exposure value, and K may be the automatic exposure enhancement coefficient of the photographing device. K may be stored in the photographing device before the automatic exposure. For a photographing device, the automatic exposure enhancement coefficient may be fixed and unique, and may be configured/set before the automatic exposure.

Specifically, the working mechanism of automatic exposure may be a negative feedback system. Using a video camera as an example of a photographing device, the video camera may first start operating from an initial exposure value, and further calculate the image brightness value of an output image. If it is determined that the image brightness value is higher than a target brightness value, the exposure value may be reduced gradually. If it is determined that the image brightness value is lower than the target brightness value, the exposure value may be increased gradually. In some embodiments, the gradual increase and/or gradual decrease of the exposure value may be realized in steps determined by the photographing device. The photographing device may increase or decrease the exposure value until the image brightness value of the output image is sufficiently close to the target brightness value. That is, two factors may affect the image brightness value of the output image. One factor may be the ambient brightness value or the light brightness of the target scene/object. The other factor may be the exposure value. Thus, the following steps may be used to determine the automatic exposure enhancement coefficient K.

In a laboratory environment, i.e., an environment with no other light interference, the automatic exposure function of the photographing device may be operated. An optical luminometer may be used to measure and record the ambient brightness value $L_E$ under the laboratory environment, to obtain the exposure values of N sets of automatic exposures and the image brightness values corresponding to the exposure values, recorded by the photographing device under the laboratory environment. For example, the exposure values of the N sets of automatic exposures and image brightness values corresponding to the N sets of automatic exposures may be $(E_1, L_1), (E_2, L_2), (E_3, L_3), \ldots, (E_N, L_N)$. Equation $K_N = E_N \times L_E / L_N$ may be used to calculate the N K values. An average value of the N K values may be obtained as the automatic exposure enhancement coefficient K, where $K = (K_1 + K_2 + \ldots + K_N)/N$. After the calculating/obtaining the automatic exposure enhancement coefficient K, K may be set/configured in the photographing device before automatic exposures outside of the laboratory environment. For illustrative purposes, $E_1, \ldots, E_N$ may be referred to as first exposure values, $L_1, \ldots, L_N$ may be referred to as first image brightness values corresponding to the first exposure values, and $K_1, \ldots, K_N$ may be referred to as first automatic exposure enhancement coefficients. In the present disclosure, term "first" and the like are merely used to indicate distinction between different objects and does not imply any order or differences in functions of the objects.

Disclosed embodiments provide a method for measuring the ambient brightness value. According to the disclosed method, exposure mechanism of the automatic exposure function, of a photographing device, may be used, to obtain exposure values and the image brightness values corresponding to the exposure values. The obtained exposure value, image brightness values, and the automatic exposure enhancement coefficient of the photographing device may be used to determine the ambient brightness value. That is, the automatic exposure function of the photographing device may be directly used to calculate the ambient brightness value, and the accuracy of the measurement may be improved. Photosensitive devices may not be used to measure the ambient brightness value. Thus, the optical design of the products/photographing device may be simplified. The products may be less costly and may have improved uniformity.

Figure 2:
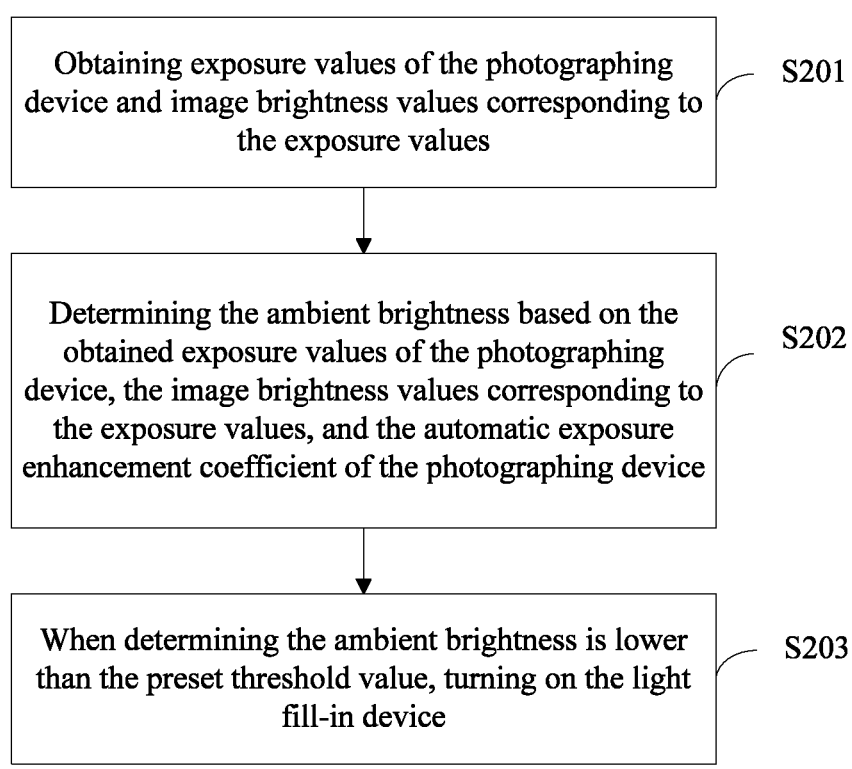
FIG. 2 illustrates another exemplary flow chart of a process for measuring an ambient brightness value consistent with various disclosed embodiments of the present disclosure.

FIG. 2 illustrates another flow chart of the disclosed method for measuring the ambient brightness value. As shown in FIG. 2, the disclosed method may further include step S203 based on the process illustrated in FIG. 1. Steps S201 and S202 may be similar to steps S101 and S102, respectively.

In step S203, when the determined ambient brightness value is lower than the preset threshold value, the light fill-in device may be turned on.

Specifically, the light fill-in device may be an infrared light fill-in device.

In various embodiments, the number of light fill-in devices may be more than one, or a light fill-in device may include more than one light sources. The more than one light fill-in devices or more than one light sources may be arranged in desired positions in, outside, or around the disclosed photographing device, depending on the position, location, and/or the surroundings of the photographing device. Using the more than one light fill-in devices distributed around the photographing device as an example, a desired number of the light fill-in devices may be controlled to turn on when the determined ambient brightness value is lower than the preset value. The specific number of the light fill-in devices to be turned on may be according to the specific ambient brightness value, determined by the photographing device. For example, when the determined ambient brightness value is considerably low or the ambient is determined to be considerably dark, a great portion or all the light fill-in devices may be turned on; and when the ambient is determined to be less dark, half or one third of the light fill-in devices may be turned on. Thus, a desired number of light fill-in devices may be turned on to provide sufficient lighting for photographing without wasting power.

In certain embodiments, the more than one light fill-in devices or more than one light sources may be arranged in a pattern to optimize the lighting. The pattern may be based on any suitable factors such as the position, location, and/or surroundings of the photographing device. To provide uniform lighting, in an example, the turned-on light fill-in devices may be uniformly distributed in the pattern.

In various embodiments, the more than one light fill-in devices or more than one light sources may be integrated with the photographing device or may be an external portion of the photographing device. Accordingly, the light fill-in devices may be controlled by the photographing device or may be controlled by an external signal.

In conventional technology, when using photosensitive devices to measure ambient brightness value, the video surveillance equipment often needs to turn on the light fill-in device when it is determined the measured ambient brightness value is lower than the preset threshold value. The light emitted by the infrared light fill-in device may include visible light, which may interfere with the measured value of the photosensitive devices. When the interference is sufficiently strong, the main body or processing unit of the video surveillance equipment may be resulted to repeatedly turn on/off the infrared light fill-in device. The video surveillance equipment may be damaged. Meanwhile, the videos/images recorded by the video surveillance equipment may be adversely affected, and the recording effect may be adversely affected. FIG. 2 may illustrate a process to solve the abovementioned problems.

Disclosed embodiments provide a method for measuring the ambient brightness value. According to the disclosed method, exposure mechanism of the automatic exposure function, of a photographing device, may be used, to obtain exposure values and the image brightness values corresponding to the exposure values. The obtained exposure value, image brightness values, and the automatic exposure enhancement coefficient of the photographing device may be used to determine the ambient brightness value. The calculated ambient brightness value may be used to determine whether the light fill-in device can be turned on. That is, the automatic exposure function of the photographing device may be directly used to calculate the ambient brightness value, and the accuracy of the measurement may be improved. Photosensitive devices may not be used to measure the ambient brightness value. Also, problems resulted from the interference to the measured value of the photosensitive device, caused by the visible light contained in the light emitted by the infrared light fill-in device, may be avoided. Thus, the optical design of the products/photographing device may be simplified. The products may be less costly and may have improved uniformity.

Figure 3:
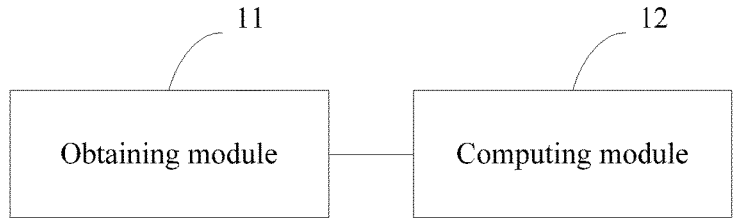
FIG. 3 illustrates an exemplary photographing device consistent with various disclosed embodiments of the present disclosure.

FIG. 3 illustrates an exemplary structure of a disclosed photographing device. As shown in FIG. 3, the photographing device may include an obtaining module 11 and a computing module 12. The obtaining module 11 may be configured to obtain the exposure values and the image brightness values corresponding to the exposure values, of the photographing device. The computing module 12 may be configured to determine the ambient brightness value based on the obtained exposure values, image brightness values, and the automatic exposure enhancement coefficient of the photographing device.

Further, the computing module 12 may be used to calculate the ambient brightness value $L_E$ using the equation: $L_E = L/(K \times E)$. In the equation, L may be the image brightness value, E may be the exposure value, and K may be the automatic exposure enhancement coefficient of the photographing device. K may be stored in the photographing device before the automatic exposure. For a photographing device, the automatic exposure enhancement coefficient may be fixed and unique, and may be configured/set before the automatic exposure.

The disclosed photographing device may be used to execute the technical solution provided in FIG. 1. The working principles of the photographing device may be referred to the description of the process illustrated in FIG. 1 and are not repeated herein.

Disclosed embodiments provide a photographing device for measuring the ambient brightness value. According to the disclosed photographing device, exposure mechanism of the automatic exposure function, of a photographing device, may be used so that, the obtaining module may obtain exposure values and the image brightness values corresponding to the exposure values. The computing module may determine the ambient brightness value based on the obtained exposure value, image brightness values, and the automatic exposure enhancement coefficient of the photographing device. That is, the automatic exposure function of the photographing device may be directly used to calculate the ambient brightness value, and the accuracy of the measurement may be improved. Photosensitive devices may not be used to measure the ambient brightness value. Thus, the optical design of the products may be simplified. The products may be less costly and may have improved uniformity.

Figure 4:
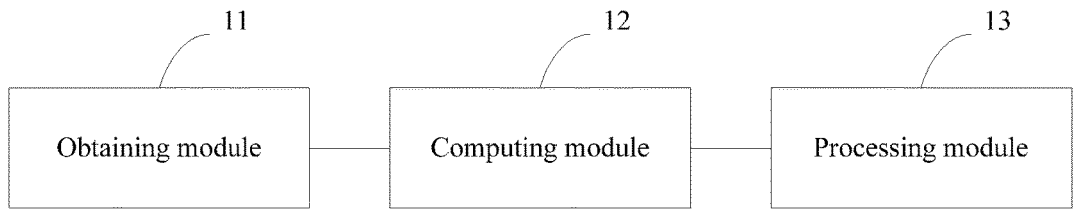
FIG. 4 illustrates another exemplary photographing device consistent with various disclosed embodiments of the present disclosure.

FIG. 4 illustrates another exemplary structure of a disclosed photographing device. As shown in FIG. 4, the photographing device may further include a processing module 13, based on the structure shown in FIG. 3. The processing module 13 may be configured to turn on the light fill-in device when the processing module 13 determines the ambient brightness value is lower than the preset threshold value.

In some embodiments, the light fill-in device may be an infrared light fill-in device.

In some embodiments, the automatic exposure enhancement coefficient of the photographing device may be set/configured before an automatic exposure.

Disclosed embodiments provide a photographing device for measuring the ambient brightness value. According to the disclosed photographing device, exposure mechanism of the automatic exposure function, of a photographing device, may be used so that, the obtaining module may obtain exposure values and the image brightness values corresponding to the exposure values. The computing module may calculate the ambient brightness value based on the obtained exposure value, image brightness values, and the automatic exposure enhancement coefficient of the photographing device. Further, the processing module may turn on the light fill-in device when determining the ambient brightness value is lower than the preset threshold value. That is, the automatic exposure function of the photographing device may be directly used to calculate the ambient brightness value, and the accuracy of the measurement may be improved. Photosensitive devices may not be used to measure the ambient brightness value. Also, problems resulted from the interference to the measured value of the photosensitive device, caused by the visible light contained in the light emitted by the infrared light fill-in device, may be avoided. Thus, the optical design of the products may be simplified. The products may be less costly and may have improved uniformity.

It should be understood by those skilled in the art that, at least part of or the entire embodiments may be implemented through computer programs and related hardware. The computer programs may be stored in a computer-readable storage medium. When the computer program is running, the computer programs may execute the steps described in the embodiments. The storage medium may include read-only memory (ROM), random access memory (RAM), a disk, a compact disc (CD), or any other medium that can be used for storing computer programs.

Figure 5:
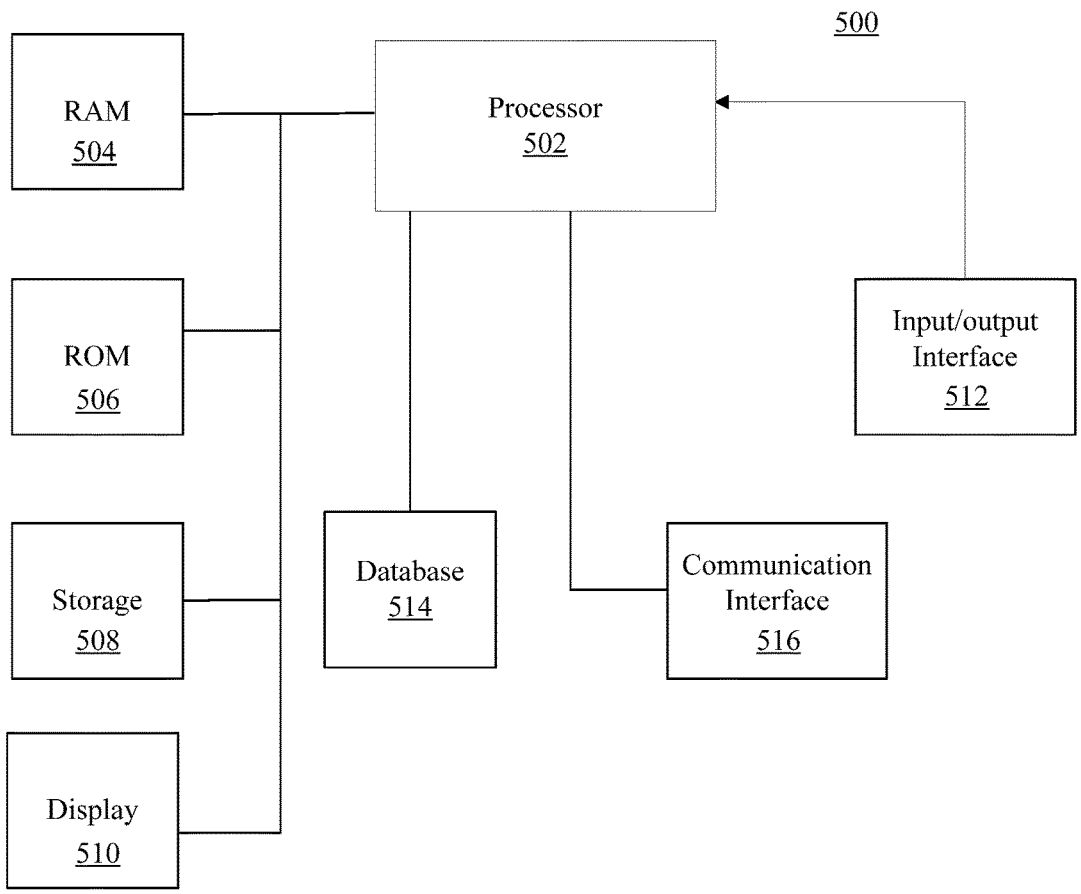
FIG. 5 illustrates a block diagram of a processing unit used in various embodiments of the present disclosure.

FIG. 5 illustrates a block diagram of the processing unit 500. Different parts of the processing unit 500 may be configured to perform the functions of various modules, e.g., the obtaining module, the computing module, and the processing module of the photographing device. The processing unit 500 may be configured to control the operation of the photographing device.

The processing unit 500 may receive, process, and execute commands from the photographing device. The processing unit 500 may include any appropriately configured computer system. As shown in FIG. 5, processing unit 500 may include a processor 502, a random access memory (RAM) 504, a read-only memory (ROM) 506, a storage 508, a display 510, an input/output interface 512, a database 514; and a communication interface 516. Other components may be added and certain devices may be removed without departing from the principles of the disclosed embodiments.

Processor 502 may include any appropriate type of general purpose microprocessor, digital signal processor or microcontroller, and application specific integrated circuit (ASIC). Processor 502 may execute sequences of computer program instructions to perform various processes associated with processing unit 500. Computer program instructions may be loaded into RAM 504 for execution by processor 502 from read-only memory 506, or from storage 508. Storage 508 may include any appropriate type of mass storage provided to store any type of information that processor 502 may need to perform the processes. For example, storage 508 may include one or more hard disk devices, optical disk devices, flash disks, or other storage devices to provide storage space.

Display 510 may provide information to a user or users of the processing unit 500. Display 510 may include any appropriate type of computer display device or electronic device display (e.g., CRT or LCD based devices). For example, the display 510 may be a liquid crystal screen of the photographing device for displaying images and videos to the user. Input/output interface 512 may be provided for users to input information into processing unit 500 or for the users to receive information from processing unit 500. For example, input/output interface 512 may include any appropriate input device, such as a keyboard, a mouse, an electronic tablet, voice communication devices, touch screens, or any other optical or wireless input devices. Further, input/output interface 512 may receive from and/or send to other external devices.

Further, database 514 may include any type of commercial or customized database, and may also include analysis tools for analyzing the information in the databases. Database 514 may be used for storing information for calculating the ambient brightness value, e.g., certain parameters. Communication interface 516 may provide communication connections such that processing unit 500 may be accessed remotely and/or communicate with other systems through computer networks or other communication networks via various communication protocols, such as transmission control protocol/internet protocol (TCP/IP), hyper text transfer protocol (HTTP), etc.

In one embodiment, the photographing device may record videos and the videos may be sent to the processor 502 through the input/output interface 512. The videos may be processed and analyzed by the processor 502 to obtain the exposure values and the image brightness values corresponding to the exposure values, and cache these values in the RAM 504. The automatic exposure enhancement coefficient of the photographing device and the threshold value may be stored in the database 514. The processor 502 may access the exposure values, the image brightness values corresponding to the exposure values, and the automatic exposure enhancement coefficient of the photographing device to calculate the ambient brightness value. In some embodiments, the processor 502 may compare the calculated ambient brightness value to the threshold value to determine whether the ambient brightness value is lower than the threshold value. If it is determined that the ambient brightness value is lower than the threshold value, the processor 502 may control the light fill-in device may be turned on, through the communication interface 516.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Disclosed embodiments provide a method for measuring the ambient brightness value. According to the disclosed method, exposure mechanism of the automatic exposure function, of a photographing device, may be used, to obtain exposure values and the image brightness values corresponding to the exposure values. The obtained exposure value, image brightness values, and the automatic exposure enhancement coefficient of the photographing device may be used to determine the ambient brightness. In some embodiments, the calculated ambient brightness value may be used to determine whether the light fill-in device can be turned on. That is, the automatic exposure function of the photographing device may be directly used to calculate the ambient brightness value, and the accuracy of the measurement may be improved. Photosensitive devices may not be used to measure the ambient brightness value. Also, problems resulted from the interference to the measured value of the photosensitive device, caused by the visible light contained in the light emitted by the infrared light fill-in device, may be avoided. Thus, the optical design of the products/photographing device may be simplified. The products may be less costly and may have improved uniformity.

Disclosed embodiments provide a photographing device for measuring the ambient brightness value. According to the disclosed photographing device, exposure mechanism of the automatic exposure function, of a photographing device, may be used so that, the obtaining module may obtain exposure values and the image brightness values corresponding to the exposure values. The computing module may calculate the ambient brightness value based on the obtained exposure value, image brightness values, and the automatic exposure enhancement coefficient of the photographing device. Further, in some embodiments, the processing module may turn on the light fill-in device when determining the ambient brightness value is lower than the preset threshold value. That is, the automatic exposure function of the photographing device may be directly used to calculate the ambient brightness value, and the accuracy of the measurement may be improved. Photosensitive devices may not be used to measure the ambient brightness value. Also, problems resulted from the interference to the measured value of the photosensitive device, caused by the visible light contained in the light emitted by the infrared light fill-in device, may be avoided. Thus, the optical design of the products may be simplified. The products may be less costly and may have improved uniformity.

REFERENCE SIGN LIST

Obtaining module 11
Computing module 12
Processing module 13
Processing unit 500
Processor 502
RAM 504
ROM 506
Storage 508
Display 510
Input/output interface 512
Database 514
Communication interface 516

What is claimed is:

1. A method for measuring an ambient brightness value implemented in a photographing device including a processor, the method comprising:

obtaining, through the processor, an automatic exposure enhancement coefficient of the photographing device, wherein the automatic exposure enhancement coefficient is calculated based on a plurality sets of automatic exposures and laboratory image brightness values, and a laboratory brightness value; each of the laboratory image brightness values corresponds to one of the automatic exposures; and the plurality sets of automatic exposures and laboratory image brightness values, and the laboratory brightness value are obtained under a laboratory environment without other light interference;

obtaining, through the processor, an exposure value of the photographing device during an automatic exposure process and an image brightness value corresponding to the exposure value; and determining, through the processor, the ambient brightness value based on the exposure value, the image brightness value, and the calculated automatic exposure enhancement coefficient of the photographing device, so as to simplify an optical design of the photographing device without a use of a photosensitive device.

2. The method according to claim 1, further comprising: in response to determining the ambient brightness value is lower than a preset threshold value, turning on at least one light fill-in device.

3. The method according to claim 2, wherein the at least one light fill-in device is an infrared light fill-in device.

4. The method according to claim 1, wherein determining the ambient brightness value based on the exposure value, the image brightness value, and the calculated automatic exposure enhancement coefficient includes: calculating the ambient brightness value according to the image brightness value and a product of the exposure value and the automatic exposure enhancement coefficient.

5. The method according to claim 4, wherein the automatic exposure enhancement coefficient of the photographing device is an average of a plurality of automatic exposure enhancement coefficients each calculated based on the laboratory brightness value and one set of an automatic exposure and a corresponding laboratory image brightness value from the plurality sets of automatic exposures and laboratory image brightness values.

6. A photographing device comprising a processor, the processor being configured to:

obtain an automatic exposure enhancement coefficient of the photographing device, wherein the automatic exposure enhancement coefficient is calculated based on a plurality sets of automatic exposures and laboratory image brightness values, and a laboratory brightness value; each of the laboratory image brightness values corresponds to one of the automatic exposures; and the plurality sets of automatic exposures and laboratory image brightness values, and the laboratory brightness value are obtained under a laboratory environment without other light interference;

obtain an exposure value of the photographing device during an automatic exposure process and an image brightness value corresponding to the exposure value; and determine an ambient brightness value based on the exposure value, the image brightness value, and the calculated automatic exposure enhancement coefficient of the photographing device, so as to simplify an optical design of the photographing device without a use of a photosensitive device.

7. The photographing device according to claim 6, wherein the processor is further configured to turn on at least one light fill-in device in response to determining the ambient brightness value is lower than a preset threshold value.

8. The photographing device according to claim 7, wherein the at least one light fill-in device is an infrared light fill-in device.

9. The photographing device according to claim 6, wherein the processor is further configured to determine the ambient brightness value according to the image brightness value and a product of the exposure value and the automatic exposure enhancement coefficient.

10. The photographing device according to claim 9, wherein the automatic exposure enhancement coefficient of the photographing device is an average of a plurality of automatic exposure enhancement coefficients each calculated based on the laboratory brightness value and one set of an automatic exposure and a corresponding laboratory image brightness value from the plurality sets of automatic exposures and laboratory image brightness values.

* * * * *